United States Patent [19]

Arch et al.

[11] Patent Number: 4,840,759
[45] Date of Patent: Jun. 20, 1989

[54] ISOPENTANE AS BLOWING AGENT TO IMPROVE COFFEE RETENTION IN FOAM CUPS MOLDED FROM EXPANDABLE POLYSTYRENE

[75] Inventors: Paul E. Arch, Wayne; Edwin H. Niemann, Downington, both of Pa.

[73] Assignee: Arco Chemical Technology, Inc., Wilmington, Del.

[21] Appl. No.: 255,679

[22] Filed: Oct. 11, 1988

Related U.S. Application Data

[62] Division of Ser. No. 184,926, Apr. 25, 1988.

[51] Int. Cl.$^4$ .............................. C08J 9/16; C08J 9/18
[52] U.S. Cl. ..................................... 264/53; 428/36.5; 521/56; 521/60; 521/146
[58] Field of Search ................... 428/36.5; 521/56, 60, 521/146; 264/53

[56] References Cited

U.S. PATENT DOCUMENTS

| | | | |
|---|---|---|---|
| 3,027,334 | 3/1962 | Wright | 521/56 |
| 3,027,335 | 3/1962 | Wright | 521/56 |
| 3,900,433 | 8/1978 | Taub | 521/146 |
| 4,049,594 | 9/1977 | Ikeda et al. | 521/911 |
| 4,108,934 | 8/1978 | Rubens et al. | 521/56 |
| 4,110,267 | 8/1978 | Ikeda et al. | 521/57 |
| 4,153,763 | 5/1979 | Bracke | 521/56 |

Primary Examiner—Morton Foelak
Attorney, Agent, or Firm—Lewis J. Young

[57] ABSTRACT

Cups have been molded from expandable styrene polymer particles having a portion or all of the blowing agent replaced by isopentane. Cups molded from these beads were coffee leak tested and generally exhibited enhanced retention of coffee.

3 Claims, No Drawings

ISOPENTANE AS BLOWING AGENT TO IMPROVE COFFEE RETENTION IN FOAM CUPS MOLDED FROM EXPANDABLE POLYSTYRENE

This is a division of application Ser. No. 07/184,926, Filed 04/25/88.

BACKGROUND OF THE INVENTION

This invention relates to molded thermoplastic foam cups.

More specifically, this invention pertains to molded thermoplastic foam cups which exhibit enhanced coffee retention properties.

The manufacture of molded articles, e.g., cups from expanded thermoplastic particles is well known. The most commonly used thermoplastic particles are expandable polystyrene beads known as EPS. Typically, polystyrene beads are impregnated with a blowing agent which boils below the softening point of the polystyrene and causes the impregnated beads to expand when they are heated. When the impregnated beads are heated in a mold cavity, they expand to fill the cavity and fuse together to form a shaped article.

The formation of molded articles, e.g., cups from impregnated polystyrene beads, is generally done in two steps. First, the impregnated polystyrene beads are pre-expanded to a density of from about 2 to about 12 pounds per cubic foot. Second, the pre-expanded beads are heated in a closed mold to further expand the pre-expanded beads and to form a fused article having the shape of the mold. The second step is generally referred to as molding.

The pre-expansion step is conventionally carried out by heating the impregnated beads using any conventional heating medium such as steam, hot air, hot water, or radiant heat. One generally accepted method for accomplishing the pre-expansion of impregnated theromplastic particles is taught in U.S. Pat. No. 3,023,175 to Rodman.

In the manufacture of foam cups, the preferred thermoplastic is expandable polystyrene beads. The polystyrene beads used to make foam cups are generally prepared by an aqueous suspension polymerization process which results in beads that can be screened to relatively precise bead sizes. Typically, bead diameters are within the range of from about 0.008 to about 0.02 inch. Occasionally, cups are made from particles having bead diameters as high as 0.03 inches.

In spite of careful bead size control, one problem which continues to plague the molded cut industry is that cups molded from expandable polystyrene beads exhibit a tendency to leak coffee. The leakage results from penetration of the coffee around the fused polystyrene beads. The present invention provides a molded foam cup which exhibits enhanced coffee retention.

SUMMARY OF THE INVENTION

It has now been found that if at least a portion of the blowing agent is replaced with isopentane, cups molded therefrom exhibit enhanced coffee retention as compared to cups molded from the same expanded thermoplastic beads in the absence of the isopentane.

DETAILED DESCRIPTION OF THE INVENTION

In the practice of this invention, any suitable thermoplastic homopolymer or copolymer can be employed. Particularly suitable for use are homopolymers derived from vinyl aromatic monomers including styrene, isopropylstyrene, alpha-methylstyrene, nuclear methylstyrenes, chlorostyrene, tert-butylstyrene, and the like, as well as copolymers prepared by the copolymerization of at least one vinyl aromatic monomer with monomers such as divinylbenzene, butadiene, alkyl methacrylates, alkyl acrylates, acrylonitrile, and maleic anhydride, wherein the vinyl aromatic monomer is present in at least 50% by weight of the copolymer. The preferred vinyl aromatic monomer is styrene.

The polymer useful in this invention must be in the form of beads, granules, or other particles convenient for the expansion and molding operations. Beads formed from an aqueous suspension process are essentially spherical and are preferred for molding foam cups.

The polymer particles are impregnated using any conventional method with a suitable blowing agent or mixtures thereof. For example, the impregnation can be achieved by adding the blowing agent to the aqueous suspension during the polymerization of the monomers, or alternatively by resuspending the polymer particles in an aqueous medium and then incorporating the blowing agent as taught in U.S. Pat. No. 2,983,692 to D'Alelio. Any gaseous material or material which will produce a gas on heating can be used as the primary blowing agent. Conventional blowing agents include aliphatic hydrocarbons containing 4 to 6 carbon atoms in the molecule, such as butanes, n-pentane, hexanes, and the halogenated hydrocarbons which boil at a temperature below the softening point of the polymer chosen. Mixtures of these blowing agents can also be used. The blowing agents are normally used in amounts of between 3 and 20 weight percent based on the polymer particles. In the present invention, from 5 to 100 weight percent of the total blowing agent must be replaced with isopentane in order to give the desired resistance to leaking of 88° C. coffee from the foam cups molded from the particles.

The invention is further illustrated, but not limited by, the following example wherein all parts and percentages are by weight unless otherwise specified.

EXAMPLE I

A series of runs were carried out as follows:

An initial polystyrene bead slurry was prepared in a 100 gallon reactor having turbine agitator blades and baffles, and temperature control means, and a pressure rating of 150 psig by adding thereto 400 lbs. of distilled water, and 400 lbs. of polystyrene beads having beads size of 98 wt-% through 35 and on 50 mesh (US Standard). While mechanically stirring the bead/water mixture, 2.8 lbs. of tricalcium phosphate, 50.8 g of sodium dodecylbenzene sulfonate, 272 g of polyoxyethylene(20)sorbitan monolaurate, and 417 g of Fischer-Tropsch wax were added and the reactor sealed.

Physical blends of n-pentane and isopentane were prepared in separate vessels using commercial n-pentane and commercial isopentane.

Following the sealing of the reactor vessel, the contents were heated to 70° C. and the addition of the blowing agent was started. The addition of 30.8 lbs of blowing agent over a period of 1.5 hours was accomplished at a rate of 0.342 lbs/min. The amount of blowing agent was calculated to give a final bead hydrocarbon content of 5.7–6.5%. Immediately upon starting the blowing agent addition, the reactor contents were heated from 70° C. to 105° C. over the first hour.

Following the completion of the addition of the blowing agent, the reactor contents were held an additional 0.5 hour at 105° C. and then cooled to 35°–55° C. for processing. The maximum reactor pressure normally occurs at the end of the addition of blowing agent. The typical pressure maximum ranges from 95–115 psig.

Following cool-down, the reactor contents were transferred to an acid wash kettle where the bead/water slurry was acidified to a nominal 1.8 pH using hydrochloric acid. The beads were held in this condition for 0.5 hours and then centrifuged and dried in a fluidized bed dryer. The dried beads were screened through a 35 mesh screen onto a 50 mesh screen. Following screening, the beads were blended with 300 ppm of silicone oil and 1000 ppm zinc stearate in a ribbon or paddle blender.

All of the expandable beads were expanded batchwise with a steam/air mixture at 93° C. in an 11 gallon pre-expander. The pre-expanded beads were aged 4–24 hours before molding into cups.

Cup molding was carried out using smooth wall molds to produce a 6 oz cup, a 12 oz cup and a 16 oz cup. The cup molding machine was set to a steam header pressure of 80 psig for the 12 oz cups and 110 psig for the 6 and 16 oz cups. A Handicup molding machine was used for the 12 oz cups, while a Thompson molding machine was used for the 6 and 16 oz cups. A back pressure of 28 psig was used for the 12 oz cups and 33 psig for the 6 and 16 oz cups. The total molding cycle for the 6 oz cups took 6.4 seconds per cup and consisted of fill time 1.4 second, dwell time 1.7 second, cook time 1.3 seconds, and cool time 2.0 seconds. Forty cups were molded from each run and allowed to age overnight before testing. Ten cups of each run were subjected to coffee retention testing as follows: Coffee at 88° C. was poured into each cup and the side walls and bottom of each cup containing coffee was observed for coffee stains or leakage every 15 minutes over a four hour period.

The mean time to failure (MTF) of each ten cup sample was calculated by adding the time to failure for each cup (the 15 minute period during which a cup exhibits leakage or staining is recorded as the time to failure for that cup) and dividing the total time by the number of cups tested. The maximum MTF value if none of the ten cups in a run exhibited any stain or leakage is 4.0 hours. The minimum MTF value if all ten cups fail within the first 15 minutes is 0.25 hour.

Coffee retention testing was repeated on a second set and a third set of ten cups of each of the runs 2 weeks and 1 month after the first test. The results of the coffee retention testing are shown in Table I. The additive level is the weight-% of isopentane per total weight of blowing agent in the beads.

TABLE I

| Additive Level[a] | 1 Day Age | | 2 Week Age | | 1 Month Age | |
|---|---|---|---|---|---|---|
| | % F | MTF | % F | MTF | % F | MTF |
| 6 oz Cup | | | | | | |
| 0 | 70 | 2.2 | 100 | 0.7 | 100 | 0.7 |
| 5 | 100 | 1.5 | 100 | 0.7 | 100 | 0.7 |
| 10 | 80 | 2.1 | 100 | 1.5 | 100 | 0.9 |
| 20 | 40 | 3.0 | 100 | 1.0 | 100 | 1.0 |
| 50 | 40 | 3.0 | 100 | 1.5 | 100 | 0.9 |
| 100 | 40 | 3.0 | 100 | 1.4 | 100 | 0.9 |
| 12 oz Cup | | | | | | |
| 0 | 0 | >4 | 80 | 1.7 | 50 | 2.8 |
| 5 | 0 | >4 | 20 | 3.3 | 70 | 2.5 |
| 10 | 0 | >4 | 0 | >4 | 0 | >4 |
| 20 | 0 | >4 | 30 | 3.0 | 0 | >4 |
| 50 | 0 | >4 | 10 | 3.8 | 0 | >4 |
| 100 | 0 | >4 | 0 | >4 | 0 | >4 |
| 16 oz cup | | | | | | |
| 0 | 0 | >4 | 100 | 1.5 | 100 | 0.8 |
| 5 | 0 | >4 | 40 | 3.1 | 0 | >4 |
| 10 | 0 | >4 | 0 | >4 | 0 | >4 |
| 20 | 0 | >4 | 0 | >4 | 0 | >4 |
| 50 | 0 | >4 | 0 | >4 | 0 | >4 |
| 100 | 10 | 3.7 | 10 | 3.7 | 50 | 2.4 |

[a]Percent isopentane in blowing agent mixture, remainder is n-pentane.
% F = percent failure.
MTF = Mean time to failure in hours.

We claim:

1. A method for enhancing the coffee retention of molded foam cups made from vinyl aromatic polymer particles which have been impregnated with a blowing agent which method consists of adding an effective amount of isopentane as a portion of the blowing agent into the polymer particles and thereafter forming and molding said particles in the shape of a cup.

2. The method of claim 1 wherein said effective amount of isopentane is between about 5.0 and 100 weight percent of the blowing agent present in the particles.

3. The method of claim 1 wherein said vinyl aromatic polymer particles are polystyrene beads.

* * * * *